No. 653,625. Patented July 10, 1900.
J. MORGAN.
PLANT PLANTING MACHINE.
(Application filed June 19, 1899.)
(No Model.) 4 Sheets—Sheet 4.
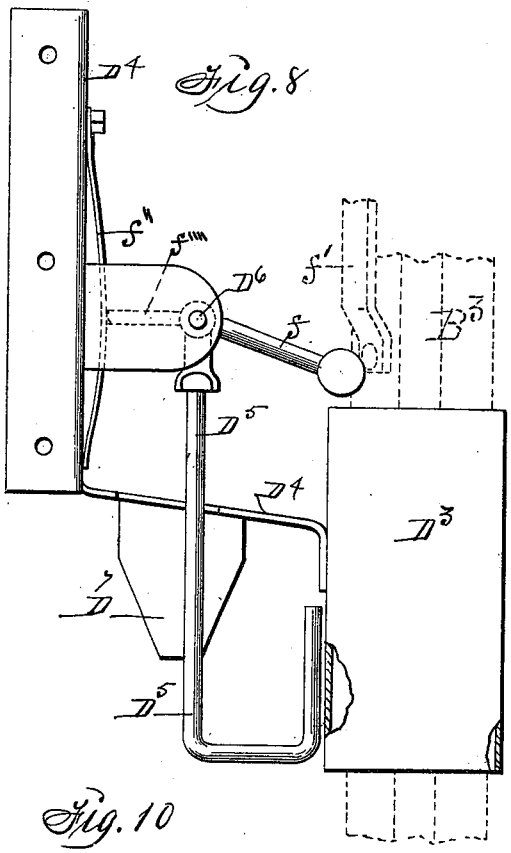
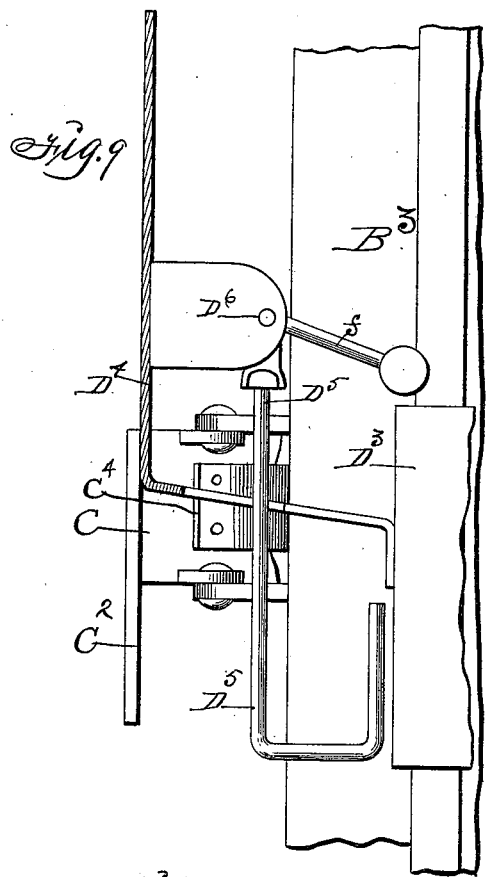
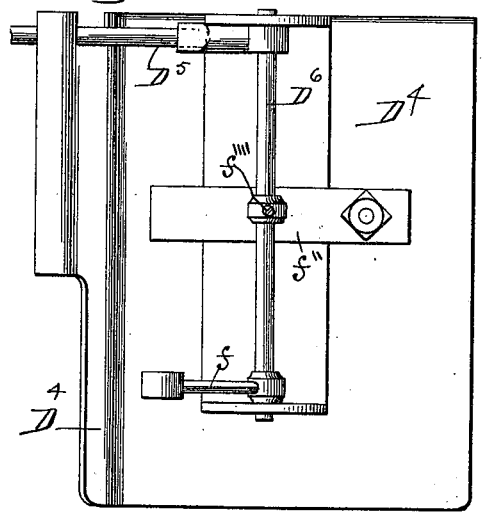
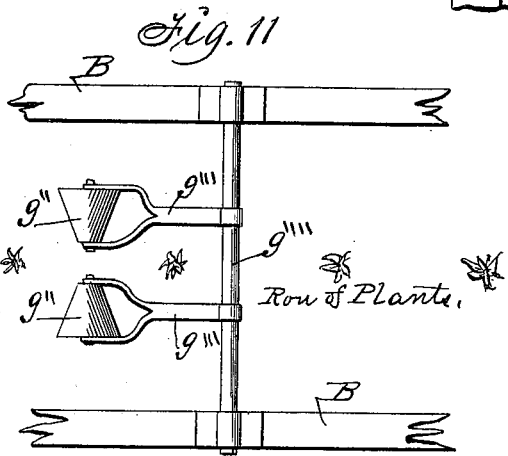

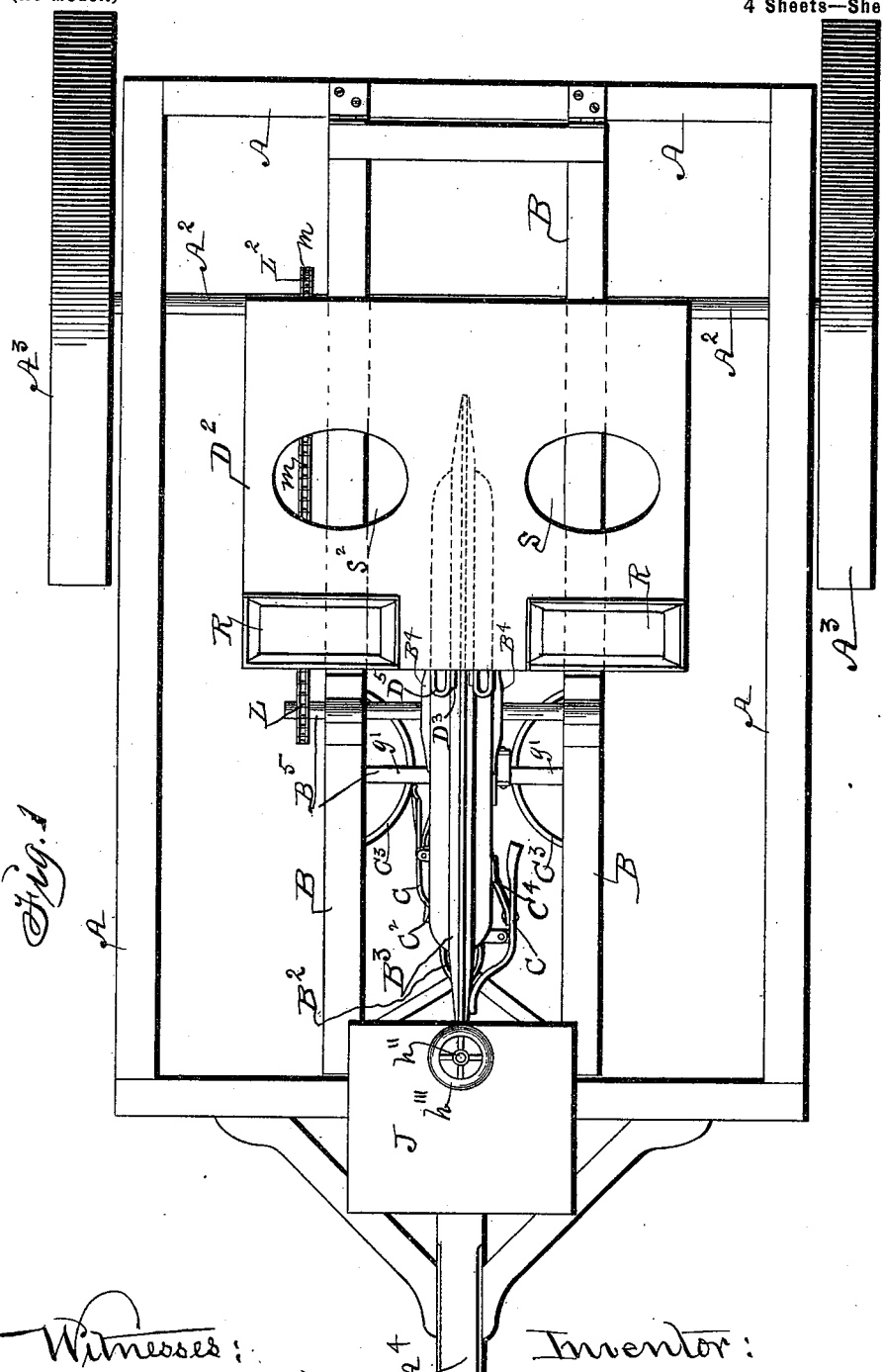

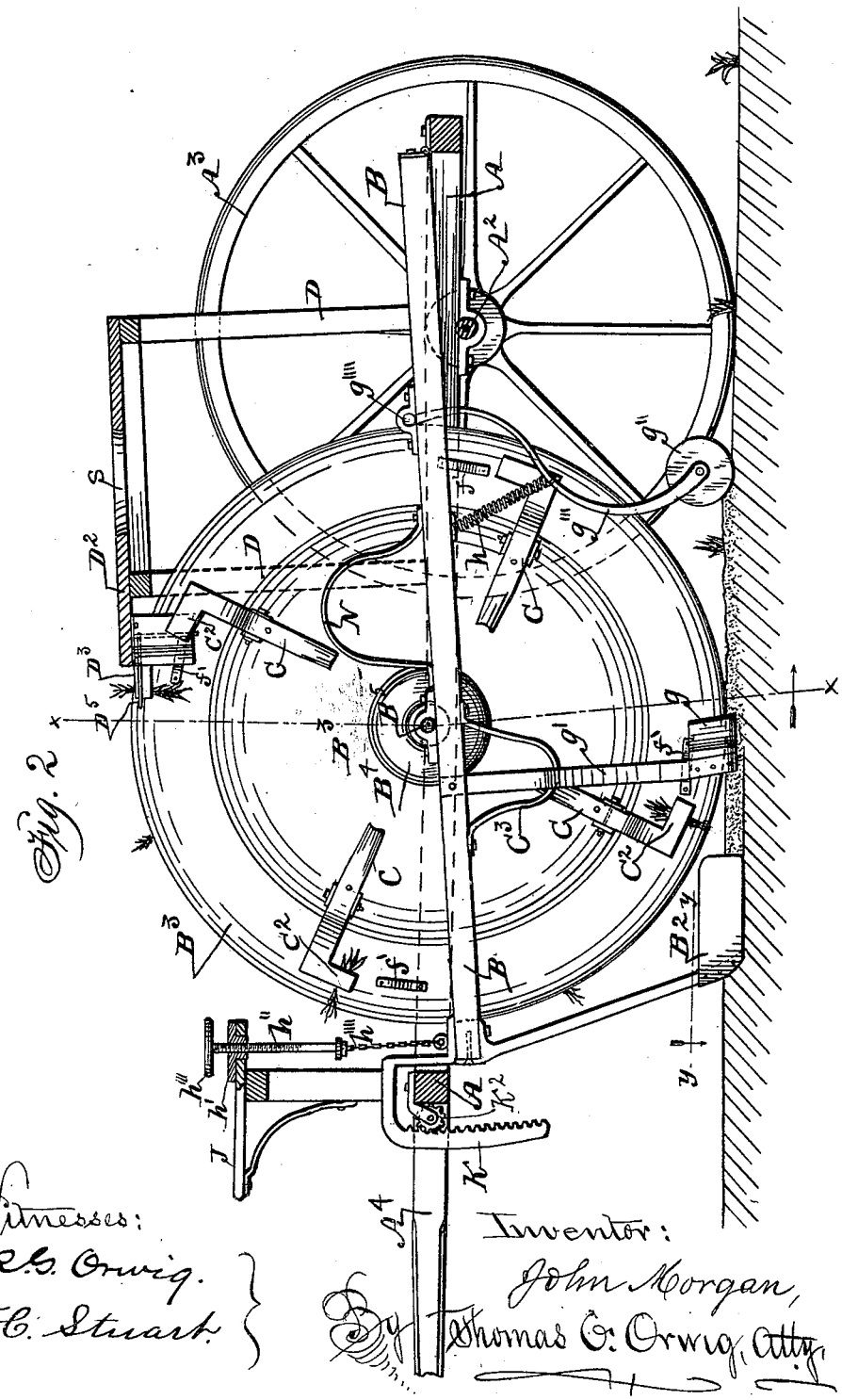

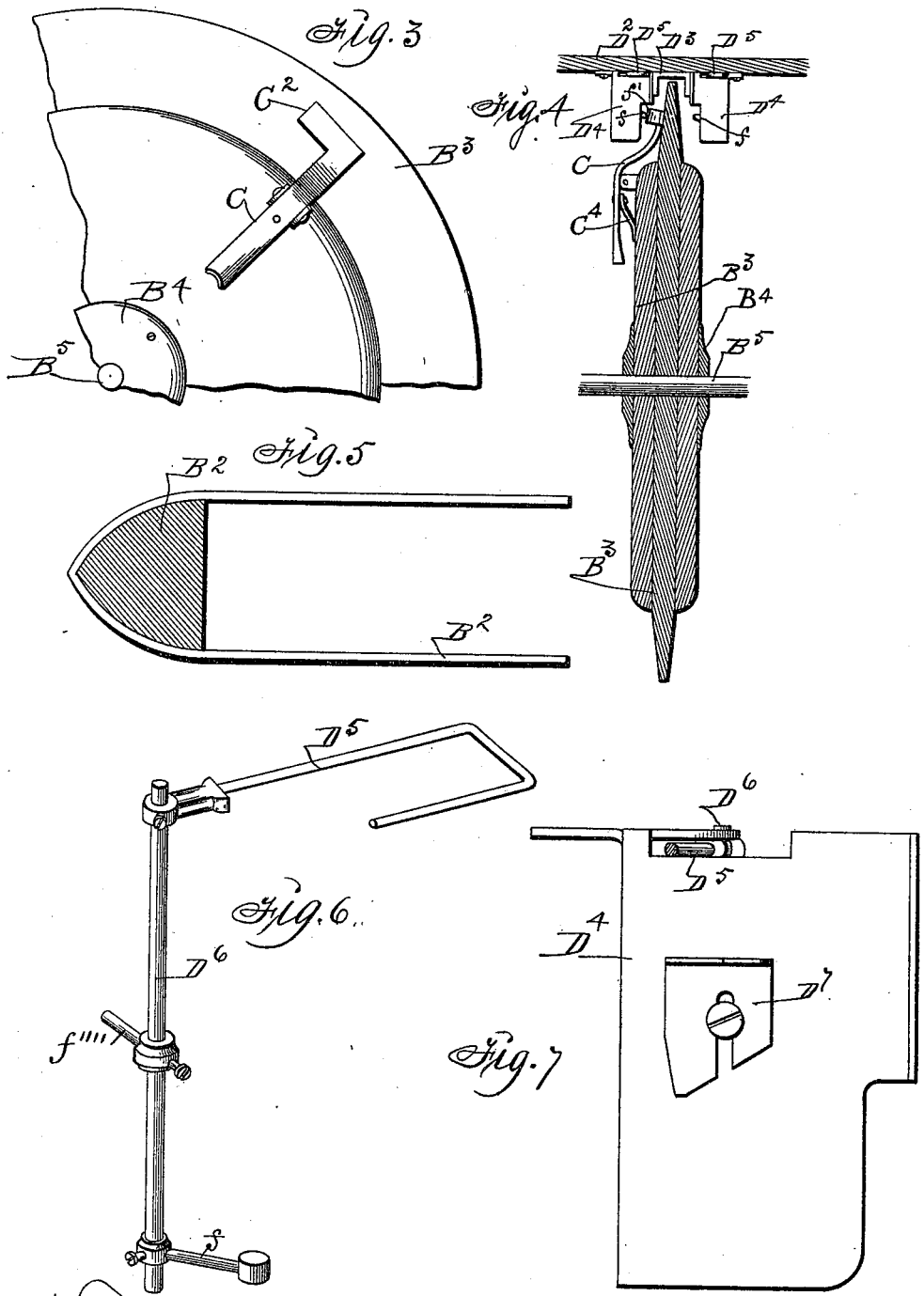

UNITED STATES PATENT OFFICE.

JOHN MORGAN, OF ATLANTIC, IOWA, ASSIGNOR OF ONE-HALF TO EDWIN WHITEWAY, OF CHICAGO, ILLINOIS.

PLANT-PLANTING MACHINE.

SPECIFICATION forming part of Letters Patent No. 653,625, dated July 10, 1900.

Application filed June 19, 1899. Serial No. 721,175. (No model.)

*To all whom it may concern:*

Be it known that I, JOHN MORGAN, a citizen of the United States, residing at Atlantic, in the county of Cass and State of Iowa, have invented a new and useful Plant-Planting Machine, of which the following is a specification.

My object is to save time, labor, and expense in setting in the ground and in rows cabbage-plants, tobacco-plants, and such other plants as are generally transplanted.

My invention is a machine adapted to be advanced in a field by means of horses; and it consists of a carriage-frame mounted upon an axle and two traction-wheels fixed thereto, an auxiliary frame pivoted to the axle, a furrow-opener fixed to the front of the auxiliary frame, a wheel for carrying plants mounted in the auxiliary frame, a plurality of plant-holders pivoted to the wheel, mechanism connected with the auxiliary frame for operating the plant-holders carried by the wheel, a bench on the rear end of the auxiliary frame for supporting a person and a collection of plants, mechanism connected with the bench to aid in connecting and holding plants on the rotating wheel and plant-carrier, mechanism for releasing plants successively from the rotatable plant-carrier and placing them in the furrow at regular intervals of space, furrow-closers fixed to the auxiliary frame, rollers for packing ground to the roots of the plants set in a furrow, mechanism for adjustably connecting the front end of the auxiliary frame with the front end of the carriage-frame, mechanism for raising and lowering the front end of the auxiliary frame, and means for transmitting rotary motion from the carriage-axle to the wheel that holds and carries and deposits plants in a furrow at regular intervals of time and space as the machine is advanced across a field.

In the accompanying drawings, Figure 1 is a plan view of my machine, showing the relative positions of the two frames and the different operative elements connected therewith. Fig. 2 is a vertical and longitudinal sectional view showing the manner of connecting the two frames and raising and lowering the front end of the auxiliary frame as required to govern the depth of furrow and to carry the furrow-opener in an inoperative position in turning about at the end of a row or moving the machine from one place or field to another. Fig. 3 is an enlarged side view of a section of the rotating wheel and one of the plant-holders that carries plants and deposits them in a furrow. Fig. 4 is a sectional view on the line $x\,x$ of Fig. 2. Fig. 5 is an enlarged view of the furrow-opener on the line $y\,y$ of Fig. 2. Fig. 6 is an enlarged detail view of mechanism connected with the bench on the rear end portion of the auxiliary frame for holding plants preparatory to connecting them with the rotatable plant-carrier. Fig. 7 is an enlarged side view of one of the frames adapted to be fixed to the under side of the bench to support an adjustable rest for the roots of plants and mechanisms for releasing plants from the bench and connecting them with the rotatable plant-carrier. Fig. 8 is a top view of Fig. 7, showing the position of the adjustable device adapted for fastening a plant to the bench preparatory to connecting the plant with the rotatable plant-carrier indicated by dotted lines. Fig. 9 is a view showing the position of a plant-holder pivoted to the rotatable plant-carrier preparatory to engaging a plant as it is released from the bench and holding it in an inverted position as required for placing the roots in the furrow as the plant is released and deposited in the furrow. Fig. 10 is an inside face view of the frame shown in Fig. 7 and the mechanism mounted thereon for automatically adjusting the device for connecting plants with the bench preparatory to transplanting them to the rotatable plant-carrier. Fig. 11 is a plan view showing rollers carried by spring-bearers pivotally connected with the auxiliary frame as required for packing ground to the roots of a row of plants as the machine is advanced.

The letter A designates a quadrangular carriage-frame mounted upon a rotatable axle $A^2$, that has fixed traction-wheels $A^3$ at its ends. It is about thirty-two inches wide and forty-eight inches long and provided with a pole $A^4$, rigidly fixed to its front and center for hitching horses thereto.

An auxiliary frame B about ten inches wide and nearly as long as the main frame A is hinged to the rear end portion of the frame A, extends forward in the center of said frame, and is adjustably connected therewith as required for raising and lowering a furrow-opener and other operative mechanism connected therewith.

$B^2$ is a furrow-opener, similar in form to the runner and furrow-opener of a corn-planter, fixed to the front and center of the frame B in such a manner that it will be carried by the frame as required to open a furrow in the ground when the machine is in operation.

$B^3$ is a wheel about thirty-two inches in diameter, composed of a central part made of wood about an inch thick and beveled at both sides at its circumference and mating parts of wood of less diameter fixed to the outside faces of the central part and metal collars $B^4$, fixed to the outside faces and center and by means of the metal collars rigidly fixed to a shaft $B^5$, mounted in bearings fixed to the parallel sides of the frame B, as shown in Figs. 1 and 2, in such a manner that the wheel will be rotated in the vertical plane of the furrow made by the furrow-opener $B^2$.

A plurality of plant-holders C, made of sheet metal and having integral lateral extensions $C^2$ at their outer ends, are pivoted to the side faces of the wheel $B^3$ at equal distances apart to extend radially in such a manner that the parts $C^2$ can clasp and hold plants to the side faces of the wheel. The plant-holders are concavo-convex at their inner ends and inclined outward and adapted to be engaged by cams $C^3$, fixed to the frame B in such a manner that each plant-holder C will be actuated by one of said cams at each revolution of the wheel as required to relax its hold upon a plant and to allow the plant to be set in the open furrow as the circumference of the wheel traverses the furrow.

A leaf-spring $C^4$ is fixed to the inside face of each plant-holder C in such a manner that the free end of the spring will engage the face of the wheel $B^3$ and normally retain the extension $C^2$ of the plant-holder in contact with the face of the wheel as required to hold a plant when placed under said end of the plant-holder.

A bench consisting of uprights D and a top $D^2$ is fixed on top of the rear end of the frame B and provided with openings through which boys can extend their legs downward while seated on the bench to feed plants to the plant-holders attached to the bench. $D^3$ is a metal plate of double-elbow shape in cross-section fixed to the under side and center of the bench $D^2$, as shown in Fig. 4, in such a manner that the circumference of the wheel $B^3$ will pass between the parallel downward-projecting portions of the plate and in such position that plants clasped to the outside faces of said parallel parts of said fixed plate can be transferred to the plant-holders C while the machine is advancing and the wheel $B^3$ is in motion.

To the under side of the bench and on each side of the plate $D^3$ is fixed a metal support $D^4$, upon which is mounted mechanism for holding plants against the plate $D^3$ and also mechanism for directing the ends $C^2$ of the plant-holders as required to engage plants and hold them to the wheel $B^3$ as they are released from the devices that first hold them to the plate $D^3$, fixed to the front and center of the under side of the bench $D^2$.

Plant-holders $D^5$, adapted to hold plants against the mating parallel parts of the plate $D^3$, are fixed to rock-shafts $D^6$ in bearings fixed to the supports $D^4$ in such a manner that the plant-holders $D^5$ will extend horizontally outward through elongated openings in the tops of the supports $D^4$ and can be actuated at regular intervals to clasp plants placed against the plate $D^3$ by a person on the bench and to retain the plants until reverse motion is imparted to the rock-shafts $D^6$ as required to release the plants from the fixed plate under the bench to be grasped by the plant-holders C, carried by the wheel $B^3$. An arm $f$, extending at right angles from the shaft $D^6$, is engaged at regular intervals by cams $f'$, fixed to the side faces of the wheel $B^3$, as required for actuating the rock-shaft to reverse the motion of the plant-holder $D^5$ as one of the plant-holders C on the wheel $B^3$ comes into proper position to clasp a plant to the wheel as it is released from the plate $D^3$, fixed to the bench $D^2$. A leaf-spring $f''$, fixed to the inside face of the support $D^4$, is engaged by the end of a pin $f''''$, fixed to the rock-shaft $D^6$, in such a manner that the pressure of the spring will hold the rock-shaft and the plant-holder $D^5$ stationary as required to retain a plant in proper position on the front and center of the fixed bench $D^2$ preparatory to the action of the wheel $B^3$ and one of the plant-holders C that will clasp it to the wheel when released from the plant-holding mechanism connected with the bench.

$D^7$ is a gage in the form of an elbow-shaped plate provided with an open slot through which a screw is passed into a screw-seat in the support $D^4$, as shown in Fig. 7, and in such a manner that the gage can be readily raised and lowered to adapt its position to the lengths of the plants that are to be fed to the machine and as required to prevent the plants from being extended down too far relative to the plant-holder $D^5$.

Furrow-closers $g$ on the lower ends of uprights $g'$, fixed to the parallel sides of the auxiliary frame B, direct the loose ground into the furrow after the plants are deposited in the furrow, and mating rollers $g''$ on the lower ends of curved spring-bearers $g'''$ on the ends of a rock-shaft $g''''$ in bearings fixed to the frame B press the loose ground as required to compact it around the roots of the plants set in the furrow. The spring-bearers are normally pressed downward by coil-springs $h$, fixed to the frame B and connected with the central portions of said curved bearers in such a manner that the rollers will press and pack the ground on the opposite sides of a row of plants and also in such a manner that they can rise as required to pass over unyielding objects that may be in their line of advance and over which the rollers must pass.

A driver's seat J is fixed on the front end of the carriage-frame A, and $h'$ is a screw-seat fixed to the driver's seat.

$h''$ is a screw provided with a hand-wheel $h'''$ at its top and extended down through the screw-seat.

$h''''$ is a chain that has a swivel connection with the lower end of the screw and is fixed to the front end of the auxiliary frame B in such a manner that the front end of the frame B can be readily raised and lowered by a person on the driver's seat by means of the screw $h''$ as required to regulate the depth of a furrow and also as required to carry the furrow-opener $B^2$ and the furrow-closers $g$ and rollers $g''$ elevated and inoperative and to facilitate turning the machine about at the end of a field.

Mating curved racks K are fixed to the front end of the auxiliary frame B in concentric position with the center of motion of said hinged frame, and pinions $K^2$ are mounted on the front end of the frame A in such a manner that they will engage the racks K and at all times connect the front end of the adjustable frame B with the front end of the frame A as required to transmit draft force to the hinged frame B to operate the furrow-openers $B^2$, the furrow-closers $g$, and the packing-rollers $g''$ as the carriage is advanced.

L is a sprocket-wheel on the end of the axle $B^5$ of the wheel $B^3$. A corresponding sprocket $L^2$ is loosely mounted on the carriage-axle $A^2$ and provided with a ratchet and pawl (not shown) in a common way, so that the wheel will be rotated with the carriage-axle when the machine moves forward, but will be idle when the machine moves rearward. A sprocket-chain $m$ connects the two wheels L and $L^2$ and transmits motion from the axle $A^2$ to the axle $B^5$ as required to rotate the wheel $B^3$ in concert with the carriage-wheels $A^3$.

To open and retain wide open the plant-holders C $C^2$ as required to pass the supports $D^4$, cam devices N are fixed to the parallel parts of the frame B to extend in proper positions to engage the inner free ends of the plant-holders C as they pass upward to allow the end portions $C^2$ of the plant-holders to pass over the outside faces of the supports $D^4$, fixed to the under side of the top $D^2$ of the bench.

R represents a receptacle on top of the bench adapted for retaining a collection of plants in convenient position for a person on the bench to take them in succession and place them in position to be grasped by the movable plant-holders $D^5$ and held to the fixed plate $D^3$ preparatory to being transferred and held to the wheel $B^3$ by the plant-holders C $C^2$, with the roots projecting outward, as shown in Fig. 2.

It is obvious the distance between plants set in a row may be regulated by the diameter of the wheel $B^3$ and the distance between the plant-holders carried by the wheel. It is also obvious one person can feed plants to the plant-holders C alternately on both sides of the plate $D^3$, fixed to the top $D^2$ of the bench, or that two persons can be seated on the bench and each one feed plants to one of the sides of the plate $D^3$ to be clasped and held by the automatic holders $D^5$. The openings S and $S^2$ in the top $D^2$ of the bench allow two boys to be seated on opposite sides of the wheel $B^3$, so that each one can advantageously feed plants to the plant-holding mechanism as the machine is advanced.

From the foregoing description of the construction and function of each element and subcombination the practical operation and utility of my invention will be readily understood by persons familiar with agricultural machinery.

What I therefore claim as new, and desire to secure by Letters Patent therefor, is—

1. In a plant-planting machine, a rectangular carriage-frame supported upon two mating traction-wheels, a fixed seat on the front provided with a screw-seat, an auxiliary frame hinged to the rear portion, a screw fitted in said screw-seat and connected with the front end of the auxiliary frame, to operate in the manner set forth for the purposes stated.

2. The carriage-frame A having a fixed seat J at its front end provided with a fixed screw-seat and mounted on an axle $A^3$ having fixed traction-wheels $A^2$ on its ends and the auxiliary frame B hinged to the rear end of the carriage-frame, a screw in said seat connected at its lower end with the auxiliary frame and means for adjustably connecting the front end of the auxiliary frame with the seat on the carriage-frame, arranged and combined for the purposes stated.

3. In a plant-planting machine, a carriage-frame, an auxiliary frame inside of the carriage-frame and pivotally connected with the rear portion thereof, means for rigidly and adjustably connecting the front of the auxiliary frame to the front of the carriage-frame consisting of an arched frame fixed to the auxiliary frame and its free end portion curved and provided with teeth to serve as a rack to engage a pinion, a pinion in bearings fixed to the front carriage, and means for raising and lowering the auxiliary frame, arranged and combined to operate in the manner set forth for the purposes stated.

4. The carriage-frame A mounted on an axle having traction-wheels on its ends, the auxiliary frame hinged to the rear and center of the carriage, a driver's seat J on the front of the carriage-frame, a screw seated in the driver's seat and connected with the front end of the auxiliary frame, means for flexibly connecting the lower end of the screw with the front end of the auxiliary frame, and means for adjustably connecting the front end of the auxiliary frame with the front end of the carriage-frame, arranged and combined to operate in the manner set forth for the purposes stated.

5. In a plant-planting machine, a carriage-frame having an elevated platform or seat at its front and center, a screw seated in said platform or seat to extend downward, an auxiliary frame pivotally connected with the rear portion of the carriage-frame and its front end flexibly connected with the lower end of said screw and means for rigidly and adjustably connecting the front end of the auxiliary frame with the front end of the carriage-frame arranged and combined to operate in the manner set forth for the purposes stated.

6. In a plant-planting machine, a carriage-frame having a rigidly-fixed pole at its front end and two mating traction-wheels at its parallel sides and rear portion, an auxiliary frame pivotally connected with the rear end of the carriage-frame and adjustably connected with the front end thereof, a furrow-opener fixed to the front of the auxiliary frame, mating furrow-closers fixed to the parallel sides of the auxiliary frame and a wheel adapted for carrying plants mounted in the auxiliary frame in rear of the furrow-closers and mating rollers carried by spring-actuated bearers adjustably connected with the auxiliary frame in rear of the plant-carrying wheel, arranged and combined to coöperate in the manner set forth for the purposes stated.

7. In a plant-planting machine, a carriage-frame, an auxiliary frame pivotally connected with the rear end of the carriage-frame and adjustably connected with the front end thereof, a furrow-opener fixed to the front of the auxiliary frame, mating furrow-closers fixed to the parallel sides of the auxiliary frame and a wheel adapted for carrying plants mounted in the auxiliary frame in rear of the furrow-closers, mating rollers carried by bearers adjustably connected with the auxiliary frame in rear of the plant-carrying wheel and a bench on rear end of the auxiliary frame and in rear of the plant-carrying wheel, arranged and combined to coöperate in the manner set forth for the purposes stated.

8. In a plant-planting machine, a carriage-frame A having a driver's seat J on its front end, an auxiliary frame B, having a hinged connection with the rear part of the carriage, a furrow-opener $B^2$ fixed to the front end of the auxiliary frame, furrow-closers $g$ fixed to the auxiliary frame in rear of the furrow-openers, mating rollers $g''$ carried by the auxiliary frame in rear of the furrow-closers, a wheel $B^3$ for carrying and setting plants in a furrow mounted in the auxiliary frame, a screw $h$ connected by means of a chain with the front end of the auxiliary frame, arched racks K fixed to the front end of the auxiliary frame and pinions $K^2$ mounted on the front end of the carriage-frame, all arranged and combined to operate in the manner set forth for the purposes stated.

9. In a plant-planting machine, a carriage-frame, an auxiliary frame pivotally connected with the rear portion of the carriage-frame and adjustably connected with the front of the carriage-frame, a bench fixed on the top of the rear end of the auxiliary frame, a metal plate fixed to the under side and center of the front edge portion of the top of the bench, automatic plant-holding mechanism fixed to the under side of the said top and on the opposite sides of the said fixed plate and a wheel carrying automatic plant-holders adapted to clasp plants as they pass the said fixed plate successively, all arranged and combined to operate in the manner set forth for the purposes stated.

10. A support for plant-holding mechanism fixed to the under side of a bench on the rear end of an auxiliary frame having a hinged connection with the rear end of a carriage-frame and an adjustable connection with the front end of the carriage-frame, a rock-shaft mounted in said support, a plant-holding device fixed to the rock-shaft and extended forward through an opening in said support and means for operating the rock-shaft, all arranged in the manner set forth for the purposes stated.

11. In a plant-planting machine an auxiliary frame pivotally connected with the rear end of a carriage-frame, a bench fixed on the rear end of the auxiliary frame, a plate fixed to the bench to project forward, a support for automatic plant-holding mechanism fixed to the under side of the bench, a rock-shaft mounted in said support, a plant-holding device fixed to the rock-shaft and extended forward through an opening in said support, and a spring fixed to the inside face of the said support, a pin or projection on the rock-shaft to engage the spring, an arm on the rock-shaft, a cam carried by a plant-carrying wheel mounted in the auxiliary frame and adapted to engage the arm on the rock-shaft, all arranged in the manner set forth for the purposes stated.

12. In a plant-planting machine, an auxiliary frame hinged to the rear end of a carriage-frame, a bench $D^2$ fixed on uprights D on the rear end of the auxiliary frame, a plate $D^3$ fixed to the under side and center of the front of said bench, a support $D^4$ fixed to the under side of said bench in juxtaposition with the said fixed plate, a plant-holder $D^5$ fixed to a rock-shaft $D^6$ mounted in bearers fixed to said support, an arm $f$ on said rock-shaft, a spring $f''$ fixed to the inside face of the support to come in contact with the end of a pin, a pin $f''''$ fixed to the rock-shaft, and means for actuating the rock-shaft at intervals, all arranged and combined to operate in the manner set forth for the purposes stated.

13. In a plant-planting machine, an auxiliary frame hinged to the rear end of a carriage-frame, a bench $D^2$ fixed on uprights D on the rear end of the auxiliary frame, a plate D³ fixed to the under side and center of the front of said bench, a support D⁴ fixed to the under side of said bench in juxtaposition with the said fixed plate, a plant-holder D⁵ fixed to a rock-shaft D⁶ mounted in bearers fixed to said support, an arm $f$ on said rock-shaft, a spring $f''$ fixed to the inside face of the support to come in contact with the end of a pin, a pin $f''''$ fixed to the rock-shaft, a wheel having automatic clasps on its side faces for carrying plants mounted in the auxiliary frame, cams $f'$ on the side faces of said wheel adapted to engage the arm of said rock-shaft, all arranged and combined to operate in the manner set forth for the purposes stated.

14. The curved spring-roller bearers $g'''$ carrying the rollers $g''$, the rock-shaft $g''''$ and the coil-springs $h$, in combination with the auxiliary frame B, as shown and described for the purposes stated.

15. In a plant-planting machine, a plant-holding device D³ fixed to a bench to project forward and downward, a bench D² fixed on top of a frame, a support D⁴ fixed to the under side of the bench and automatic plant-holding mechanism mounted in said support, arranged and combined to operate in the manner set forth.

16. A plant-planting machine comprising a two-wheeled carriage, a driver's seat on the front of the frame, an auxiliary frame hinged to the rear portion of the carriage-frame, means for adjustably connecting the front end of the auxiliary frame with the carriage-frame, a furrow-opener fixed to the front end of the auxiliary frame, furrow-closers fixed to the auxiliary frame in rear of the furrow-openers, spring-bearers fixed to the auxiliary frame in rear of the furrow-closers to carry rollers, a plant-carrying wheel mounted in the auxiliary frame, plant-holders pivoted to the wheel to clasp plants to the face of the wheel, cams fixed to the auxiliary frame to actuate the plant-holders on the wheel, means for transmitting motion from the carriage-axle to the plant-carrying wheel mounted in the auxiliary frame, a bench fixed on the rear end portion of the auxiliary frame, a plate fixed to the bench to project forward and downward from the front and center of the bench, supports for automatic mechanism fixed to the under side of the bench, a rock-shaft mounted in each of said supports and provided with an arm extending at right angles therefrom, plant-holders fixed to said rock-shafts and means for retaining the rock-shafts stationary at intervals during each revolution of the plant-carrying wheel, all arranged and combined to operate in the manner set forth for the purposes stated.

JOHN MORGAN.

Witnesses:
EDWARD BUTLER,
SAMUEL H. RUDOLPH.